United States Patent
Manos

(10) Patent No.: US 6,527,153 B1
(45) Date of Patent: Mar. 4, 2003

(54) COMBINATION COOLER AND BEACH CHAIR HOLDER FOR A BICYCLE

(76) Inventor: John Louis Manos, 35 Taylor St., Stanton, VA (US) 24401

( * ) Notice: Subject to any disclaimer, the term of this patent is extended or adjusted under 35 U.S.C. 154(b) by 156 days.

(21) Appl. No.: 09/709,497

(22) Filed: Nov. 13, 2000

Related U.S. Application Data

(63) Continuation-in-part of application No. 09/391,505, filed on Sep. 8, 1999, now abandoned.

(51) Int. Cl.$^7$ .................................................. B62J 7/00
(52) U.S. Cl. ..................... 224/427; 224/430; 224/435; 224/454; 224/462; 224/527
(58) Field of Search ................................ 224/419, 420, 224/407, 411, 415, 425, 427, 428, 429, 430, 431, 433, 434, 435, 451–454, 461, 462, 526, 527, 566, 245, 275; 220/23, 89; D12/407–420

(56) References Cited

U.S. PATENT DOCUMENTS

| | | | | |
|---|---|---|---|---|
| 297,238 A | * | 4/1884 | Dopp et al. | 224/419 |
| 449,460 A | * | 3/1891 | Bannister | 224/414 |
| 593,978 A | * | 11/1897 | Boehm | 224/420 |
| 670,503 A | | 3/1901 | Cowles | |
| 733,865 A | | 7/1903 | Murdoch | |
| 1,015,455 A | * | 1/1912 | Neesham | 206/541 |
| 1,417,223 A | | 5/1922 | Anderson | |
| 2,578,243 A | | 12/1951 | Hampton | |
| 3,301,448 A | * | 1/1967 | Inoue | 224/417 |
| 4,117,962 A | | 10/1978 | Pletscher | |
| 4,195,757 A | * | 4/1980 | Jefferson | 206/541 |
| 4,260,084 A | * | 4/1981 | Warren, Jr. | 224/328 |
| 4,284,217 A | | 8/1981 | Johnson et al. | |
| 4,296,878 A | | 10/1981 | Ward et al. | |
| 4,345,704 A | | 8/1982 | Boughton | |
| D271,541 S | * | 11/1983 | Rockwell | D3/40 |
| 4,550,930 A | * | 11/1985 | Proffit | 224/274 |
| 4,588,114 A | * | 5/1986 | Lebaron et al. | 224/413 |
| 4,889,267 A | * | 12/1989 | Bolton | 224/274 |
| 5,340,003 A | | 8/1994 | Wilson | |
| 5,752,634 A | * | 5/1998 | Kortman | 224/274 |
| 5,845,830 A | * | 12/1998 | Dreiling | 224/412 |
| 5,931,361 A | * | 8/1999 | Schwimmer | 224/418 |
| 6,000,590 A | * | 12/1999 | Allen | 206/359 |

FOREIGN PATENT DOCUMENTS

| | | |
|---|---|---|
| GB | 2 259 678 | 3/1993 |
| NO | 75753 | 10/1949 |

* cited by examiner

Primary Examiner—Stephen K. Cronin
(74) Attorney, Agent, or Firm—Stephen Christopher Swift; Swift Law Office

(57) ABSTRACT

A holder for a cooler (or a similar object) on a bicycle (or other vehicle), which preferably is combined with a holder for a beach chair (or a similar object). In the preferred embodiments, the bicycle has a rack behind the seat and over the rear wheel, with a holder fastened over the rack. The holder has a rectangular bottom, an open top, and front, back, left and right walls that are perpendicular to the bottom. The front and back walls are joined by rounded corners to the left and right walls. The holder is suitably dimensioned and configured to retain a rectangular cooler with rounded corners. The holder is preferably made out of rigid, smooth plastic, which will not be deformed by the weight of the cooler, but will have sufficiently low friction with the exterior surface of the cooler that the cooler can be easily removed. Different sizes of holders may be used for different sizes of coolers. The holder may be bolted to the frame, or securely retained by other suitable means. Clips with pairs of inwardly-biased curved flexible members are attached to the holder or to the frame of the bicycle, to retain the beach chair by its metal tubing. The cooler should be inserted into its holder first, then the beach chair placed over the cooler.

12 Claims, 5 Drawing Sheets

COMBINATION COOLER AND BEACH CHAIR HOLDER FOR A BICYCLE

CROSS REFERENCE TO RELATED APPLICATION

This application is a Continuation-In-Part of Ser. No. 09/391,505, filed Sep. 8, 1999 now abandoned.

BACKGROUND OF THE INVENTION

1. Field of the Invention

The present invention relates to an apparatus for retaining and transporting a cooler and/or a beach chair on a bicycle.

2. Description of the Prior Art

The present invention provides a convenient means for people traveling to a beach or other area by bicycle to bring along a cooler and a beach chair. While there are numerous prior inventions for carrying items on bicycles, none of the prior inventions have all the features of the present invention, which includes a hollow rectangular cooler holder with an open top, which is fastened over the rear wheel of a bicycle, and one or more clips or other fasteners for the beach chair.

U.S. Pat. No. 670,503, issued on Mar. 26, 1901, to Frank H. Cowles, discloses a luggage carrier for bicycles, which is fastened above the rear wheel, including a platform to which is attached a receptacle with a strap for retaining the luggage. The present invention is distinguishable, in that it includes a rectangular holder with rounded corners designed to retain a cooler without any strap, and in preferred embodiments, a flexible clip on the side of the holder or the bicycle's frame for retaining a beach chair.

U.S. Pat. No. 733,865, issued on Jul. 14, 1903, to Lindsey Murdoch, discloses a carrying attachment for bicycles, which is attached to the frame on a bicycle, with a platform that extends outward from the frame and is designed to hold a variety of articles. The present invention is distinguishable, in that it discloses a rectangular holder with rounded corners designed to retain a cooler above the rear wheel of a bicycle, and in preferred embodiments, a flexible clip on the side of the holder or the bicycle's frame for retaining a beach chair.

U.S. Pat. No. 1,417,223, issued on May 23, 1922, to Carl A. Anderson, discloses a package carrying attachment that is above the rear wheel of a bicycle, having a rectangular frame on which the package rests, and a pair of clamping wings that retain the package on the frame. The present invention is distinguishable, in that no clamping members are required to retain a cooler and/or beach chair.

U.S. Pat. No. 2,578,243, issued on Dec. 11, 1951, to Lucian W. Hampton, discloses a load carrying attachment for bicycles, motorcycles and the like, with a U-shaped hood that covers the upper part of the rear wheel, with the load being placed over the hood. The present invention is distinguishable, in that it has a holder with an open top and a clip.

U.S. Pat. No. 4,117,962, issued on Oct. 3, 1978, to Oskar Pletscher, discloses a bicycle luggage carrier equipped with a recognition and safety device, having a holder bracket connected to the rear end of the bicycle's frame. The present invention is distinguishable, in that it has a holder with an open top and a clip.

U.S. Pat. No. 4,284,217, issued on Aug. 18, 1981, to James J. Johnson and Robert W. Clarke, discloses a ball carrier, with a holder releasably engaging the bicycle's handlebar. The present invention is distinguishable, in that it has a holder with an open top for a cooler, and in preferred embodiments, a clip for a beach chair on the side of the holder or the bicycle's frame.

U.S. Pat. No. 4,296,878, issued on Oct. 27, 1981, to Franklin D. Ward and Rock A. Engeman, discloses a surfboard carrier, having U-shaped members that extend from the rear of a bicycle. The present invention is distinguishable, in that it has a rectangular holder above the rear wheel.

U.S. Pat. No. 4,345,704, issued on Aug. 24, 1982, to Matthew S. Boughton, discloses a bottle mount for bicycles, which is retained on a frame tube of a bicycle by a band. The present invention is distinguishable in that it combines a holder for a cooler with a clip for a beach chair.

U.S. Pat. No. 5,340,003, issued on Aug. 23, 1994, to Mark S. Wilson, discloses a bicycle carrier rack adapter, fastened over the rear wheel of a bicycle, allowing for attachment of child carriers, cargo carriers, surfboard racks, golf club bag carriers, etc. It does not disclose a holder for a cooler combined with a clip for a beach chair, as in the present invention.

British Patent No. 2 259 678, published on Mar. 24, 1993, to Kenneth Vincent Jackson, discloses a device for supporting carrier bags on bicycles, which is attached above the rear wheel.

Norwegian Patent No. 75753, published on Oct. 10, 1949, to Carl Albert Söderberg, discloses a device by which a briefcase or cassette can be locked over the rear wheel of a bicycle.

None of the above inventions and patents, taken either singly or in combination, is seen to describe the instant invention as claimed.

SUMMARY OF THE INVENTION

The present invention is a holder for a cooler (or a similar object) on a bicycle (or other vehicle), which preferably is combined with a holder for a beach chair (or a similar object). In the preferred embodiments, the bicycle has a rack behind the seat and over the rear wheel, with a holder fastened over the rack. The holder has a rectangular bottom, an open top, and front, back, left and right walls that are perpendicular to the bottom. The front and back walls are joined by rounded corners to the left and right walls. The holder is suitably dimensioned and configured to retain a rectangular cooler with rounded corners. The holder is preferably made out of rigid, smooth plastic, which will not be deformed by the weight of the cooler, but will have sufficiently low friction with the exterior surface of the cooler that the cooler can be easily removed. Different sizes of holders may be used for different sizes of coolers. The holder may be bolted to the frame, or securely retained by other suitable means. clips with pairs of inwardly-biased curved flexible members are attached to the holder or to the frame of the bicycle, to retain the beach chair by its metal tubing. The cooler should be inserted into its holder first, then the beach chair placed over the cooler.

Accordingly, it is a principal object of the invention to provide a convenient means of transporting a cooler and a beach chair on a bicycle.

It is another object of the invention to encourage people to get more physical exercise, by making it easy to carry commonly used beach equipment by bicycle, rather than driving to the beach by automobile.

It is a further object of the invention to reduce pollution to the environment by encouraging bicycling rather than driving to the beach.

Still another object of the invention is to reduce dependence on fossil fuels, by encouraging bicycling instead of driving.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a holder for a cooler (or a similar object) on a bicycle (or other vehicle), which preferably is combined with a holder for a beach chair (or a similar object).

Figure 1:
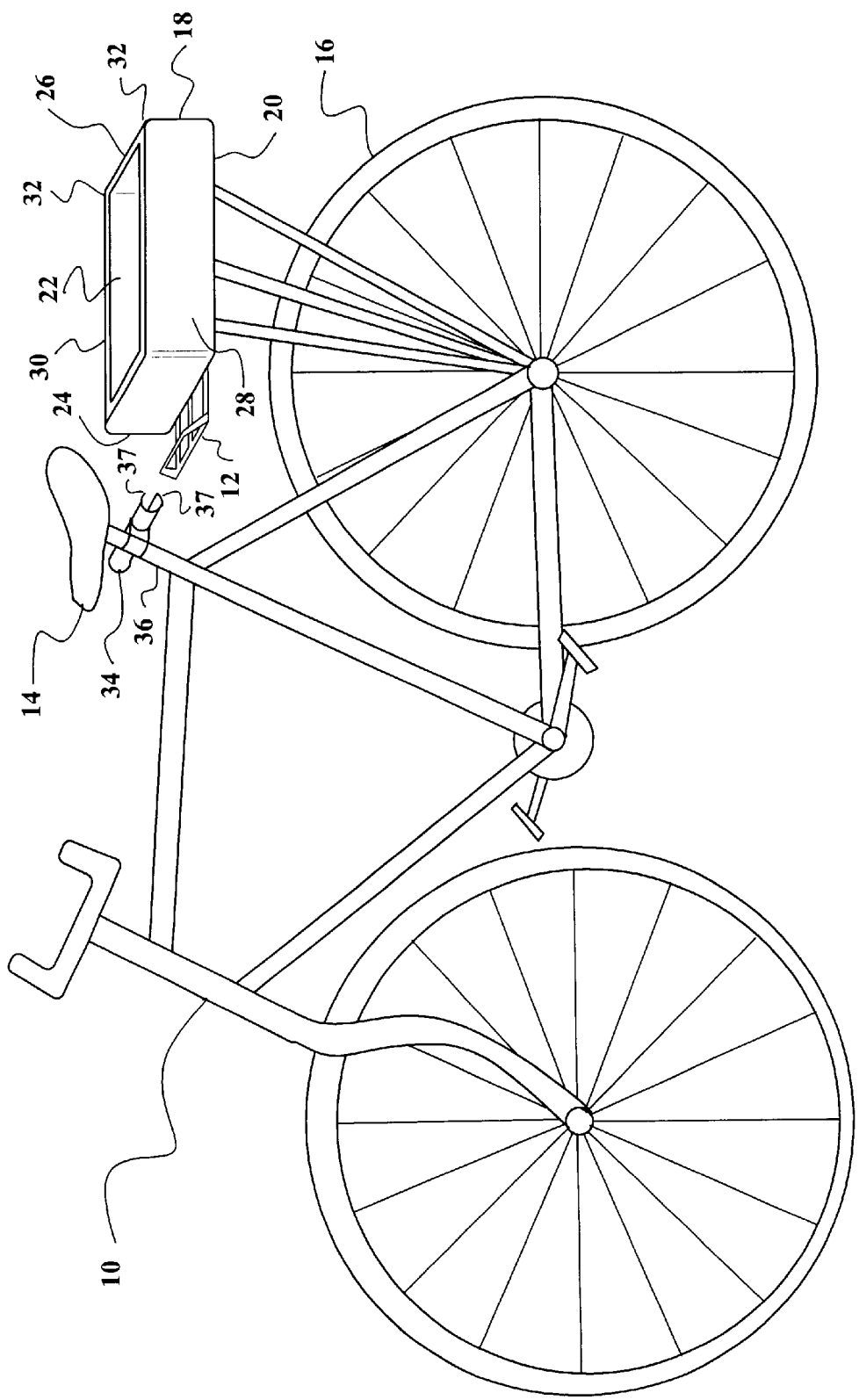
FIG. 1 is a perspective view of the first preferred embodiment of the invention.

FIG. 1 is a perspective view of the first preferred embodiment of the invention, showing a bicycle 10 having a rack 12 behind the seat 14 and over the rear wheel 16, with a holder 18 fastened over the rack. (The holder may also be attached to the bicycle in any other suitable location, and may be attached to other types of platforms besides racks.) The holder has a rectangular bottom 20, an open top 22, a front wall 24, a back wall 26, a left side wall 28, and a right side wall 30. The walls are perpendicular to the bottom. The front and back walls are joined by rounded corners 32 to the left and right walls. The holder may be bolted to the frame of the bicycle or other vehicle, bolted to another part of the vehicle, screwed, nailed, welded or glued to the vehicle, formed in one piece with part of the vehicle, or securely retained by other suitable means. The C-shaped clip 34 is attached to part of the frame 36 of the bicycle below the seat. The C-shaped clip has a pair of inwardly-biased curved flexible members 37, and is suitably dimensioned and configured to retain a cylindrical part of an object, such as the tubing on a beach chair.

Figure 2:
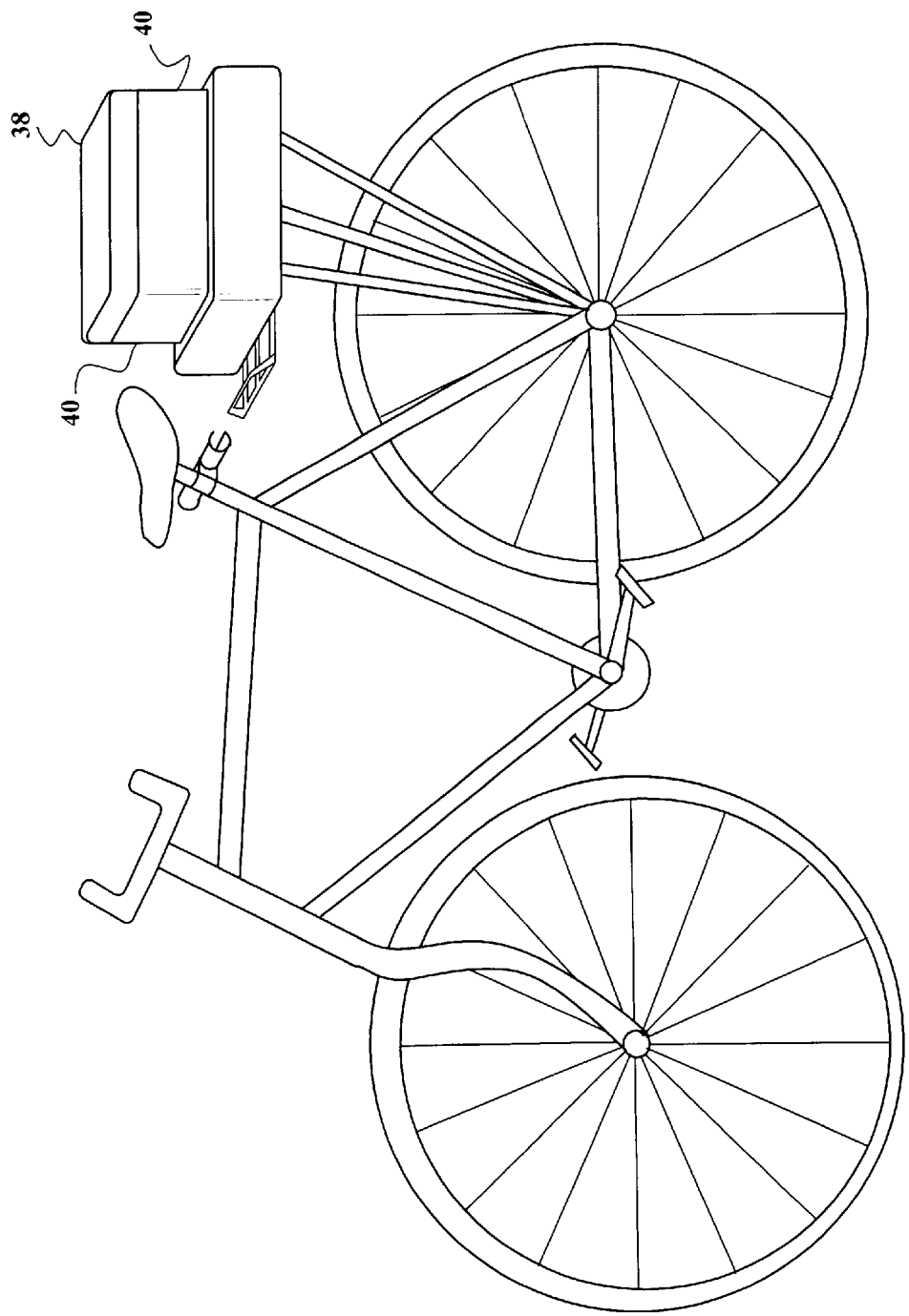
FIG. 2 is a perspective view of the first preferred embodiment of the invention, showing its use to transport a cooler.

FIG. 2 is a perspective view of the first preferred embodiment of the invention, showing its use to transport a cooler 38. It can be seen that the holder is suitably dimensioned and configured to retain the rectangular cooler with its rounded corners 40. For the cooler to be securely retained, the exterior of its bottom portion (not visible in FIG. 2) must closely match the interior of the holder. The holder is preferably made of plastic or other suitable material, that is slightly elastic. The exterior of the bottom portion of the cooler should preferably be very slightly larger than the interior space of the holder when it is empty, so that pressure from the walls of the holder against the sides of the cooler, combined with friction between the walls of the holder and the sides of the cooler and the force of gravity, will retain the cooler in the holder. But the pressure and friction should be sufficiently low that the cooler can be easily removed by hand. Different sizes of holders may be used for different sizes of coolers. Although primarily intended to carry coolers, the holder could also be used to carry other objects of similar size and shape.

Figure 3:
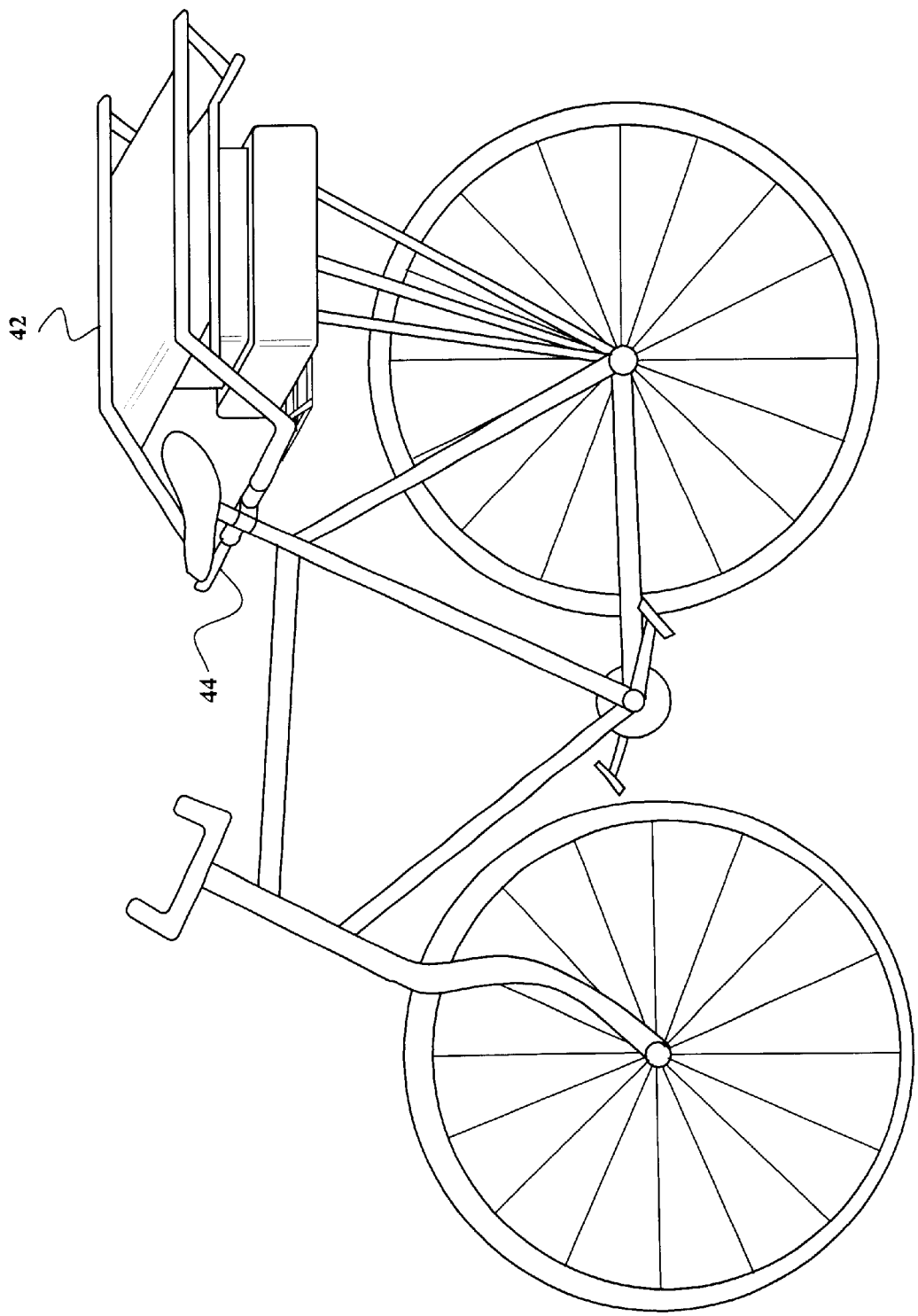
FIG. 3 is a perspective view of the first preferred embodiment of the invention, showing its use to transport both a cooler and a beach chair.

FIG. 3 is a perspective view of the first preferred embodiment of the invention, showing its use to carry both a cooler and a beach chair 42. The cooler must be inserted into the holder first. The beach chair is then placed over the cooler. The beach chair is held in place by inserting part of its metal tubing 44 in the clip.

Figure 4:
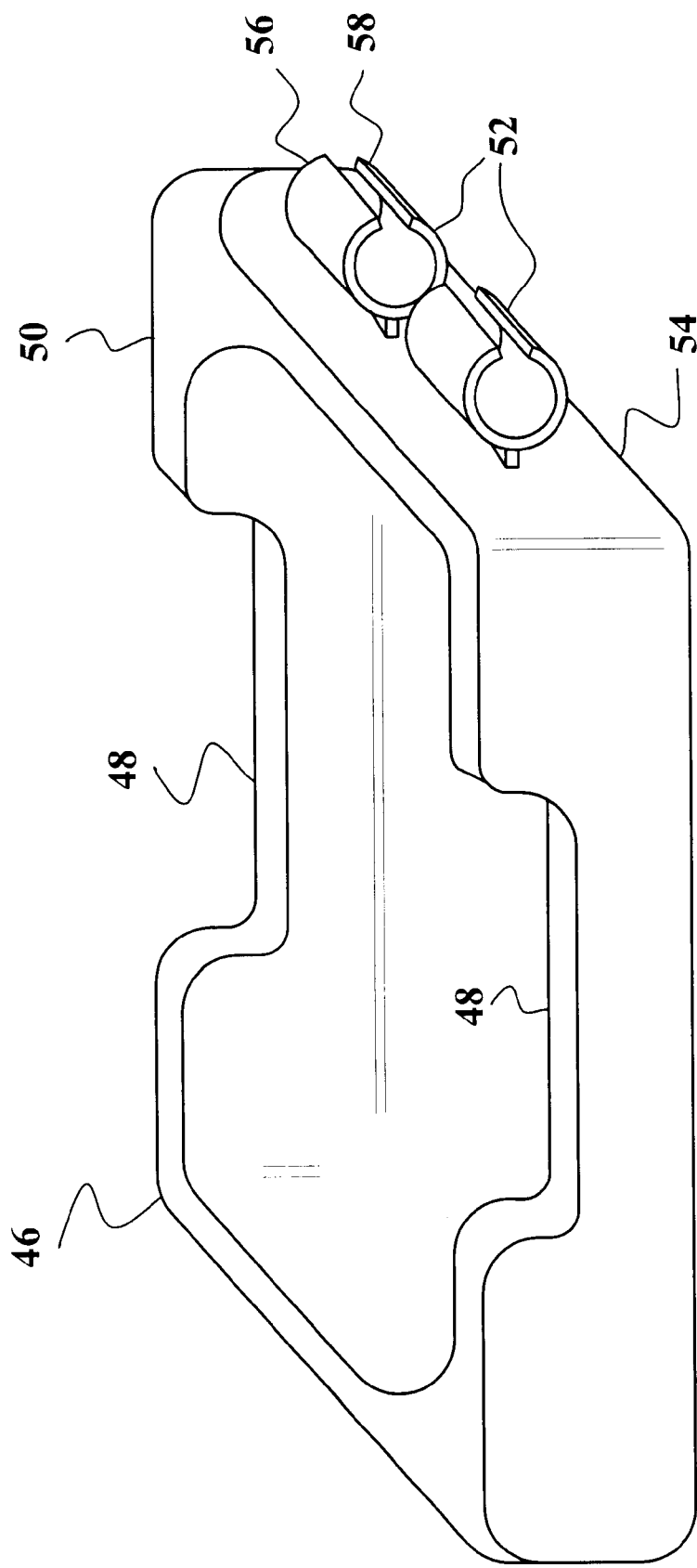
FIG. 4 is a perspective view of the holder used in the second preferred embodiment of the invention, showing the clips on its side.

FIG. 4 is a perspective view of the holder 46 in the second preferred embodiment, which has lowered center portions 48 in its left and right walls 50, to make it easier to remove the cooler. The second preferred embodiment also differs from the first preferred embodiment in the placement and configuration of the two clips 52, which are attached to the front wall 54 of the holder. (The holder is placed on the bicycle as in the first preferred embodiment.) The clips have a cross-section resembling the letter "C". Each clip has an upper arm 56 and a lower arm 58, which are inwardly biased. As before, these clips are suitably dimensioned and configured to retain a cylindrical part of an object, such as the tubing on a beach chair. Alternatively, either or both types of clips shown could be attached to the holder and/or frame, in the same or different locations from these shown in the drawings, and straps with hook and loop material, or other types of fasteners, could also be used to retain beach chairs, umbrellas, or other objects.

Figure 5:
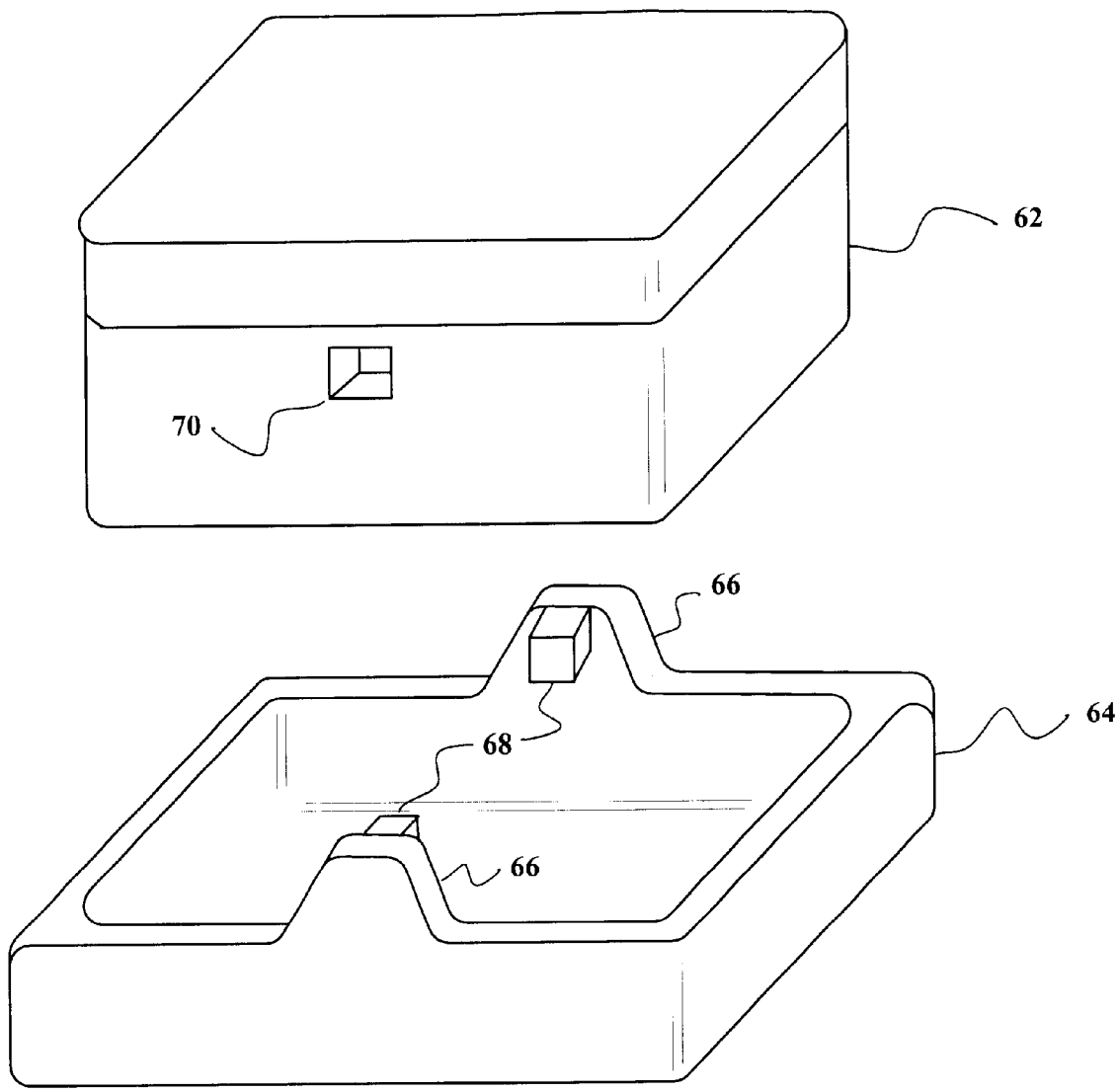
FIG. 5 is a perspective view of the holder and the cooler used in the third preferred embodiment of the invention, with the cooler shown above the holder.

FIG. 5 is a perspective view of the holder and the cooler used in the third preferred embodiment of the invention, with the cooler 62 shown above the holder 64. There are flexible projections 66 from the left and right walls of the holder with inward male members 68 that can matingly engage female recesses 70 in the left and right sides of the cooler (only one of which is visible in FIG. 5). Alternatively, the male and female members could be in the front and back walls and sides, or even in the corners. Preferably, there should be at least one pair of male projections on opposite sides of the holder, and at least one pair of female recesses on opposite sides of the cooler. There may be multiple pairs of male and female members, to more securely retain the cooler. The projections should be sufficiently flexible that the cooler can be easily inserted and removed from the holder, but sufficiently rigid to securely retain the cooler while it is being transported. Although primarily intended to carry coolers, the holder could also be used to carry objects of similar size and shape, with matching female recesses. The holder is placed on the bicycle, as in the first and second preferred embodiments, and either type of clip may be used in the third preferred embodiment.

In either the first, second or third preferred embodiment, retention of the beach chair by the clip may be reinforced by an elastic cord (not shown in the drawings) of the type commonly called a "bungee cord". The elastic cord may have two hooks, permanently attached to opposite ends of the cord, that fit into metal loops (not shown in the drawings) that are permanently attached to the beach chair. A third hook may be attached to a middle portion of the elastic cord, that can fit into an eye (not shown in the drawings) in a wall (or an extension from a wall) of the holder. The elastic cord should preferably be attached on an opposite side of the holder and beach chair from the clip.

In either the first, second or third preferred embodiment, there may be an opening (not shown in the drawings) in the center of the bottom of the holder, to reduce the weight of the holder and the cost of the material used to make the holder.

In transporting a cooler and a beach chair on the bicycle, a user must follow the steps of:

attaching the holder to the rack or other platform (unless it has already been installed by the bicycle's manufacturer);

inserting the cooler into the container;

attaching a beach chair over the cooler;

traveling to the beach or other destination by means of the bicycle;

removing the beach chair at the destination; and removing the cooler from the container.

The beach chair may be attached by the clips and/or the elastic cord described above.

Although the invention is primarily intended for bicycles, it may also be used with tricycles or other pedal-driven vehicles, motorcycles, or any other vehicles. It is to be understood that the present invention is not limited to the sole embodiment described above, but encompasses any and all embodiments within the scope of the following claims.

I claim:

1. A container combined with a holder for a vehicle, comprising:

a rectangular box-shaped container with rounded corners;

a holder having a rectangular bottom, an open top, and front, back, left and right walls perpendicular to the bottom, with the front and back walls being joined by rounded corners to the left and right walls, said holder being made of an elastic material, and suitably dimensioned and configured to removably retain the container by pressure and friction;

a means for retaining the holder on a vehicle;

a clip with a pair of inwardly-biased curved flexible members, said clip being suitably dimensioned and configured to retain a cylindrical part of an object; and an elastic cord having opposite ends that can be removably attached to the object, and a middle portion that can be removably attached to the holder.

2. The container combined with a holder for a vehicle according to claim 1, wherein there is an opening in the bottom.

3. The container combined with a holder for a vehicle according to claim 1, in combination with a pedal-driven vehicle on which the holder is retained.

4. The container combined with a holder for a vehicle according to claim 3, wherein the pedal-driven vehicle is a bicycle, and the holder is retained behind a seat of the bicycle and over a rear wheel of the bicycle.

5. The container combined with a holder for a vehicle according to claim 4, wherein the clip is attached to a frame of the bicycle.

6. The container combined with a holder for a vehicle according to claim 1, including:

at least one male projection extending from the holder that matingly engages at least one female recess in the container, to further removably retain the container in the holder.

7. The container combined with the holder for a vehicle according to claim 6, wherein there are at least one pair of male projections extending from opposite walls of the holder, that matingly engage at least one pair of female recesses in opposite sides of the container.

8. The container combined with a holder for a vehicle according to claim 7, in combination with a pedal-driven vehicle on which the holder is retained.

9. The container combined with a holder for a vehicle according to claim 8, wherein the pedal-driven vehicle is a bicycle, and the holder is retained behind a seat of the bicycle and over a rear wheel of the bicycle.

10. The container combined with the holder for a vehicle according to claim 9, wherein the clip is attached to a frame of the bicycle.

11. A method of transporting a cooler and a beach chair on a bicycle, comprising the steps of:

attaching a holder to a platform behind a seat over a rear wheel of a bicycle, said holder having a rectangular bottom, an open top, and front, back, left and right walls perpendicular to the bottom, with the front and back walls being joined by rounded corners to the left and right walls, and said holder being suitably dimensioned and configured to removably retain a rectangular cooler with rounded corners;

inserting the cooler into the container;

attaching a beach chair over the cooler by means of at least one clip with a pair of inwardly-biased curved flexible members, said clip being suitably dimensioned and configured to retain tubing of the beach chair, and said clip being attached to the holder;

traveling to a destination by means of the bicycle;

removing the beach chair at the destination; and removing the cooler from the container.

12. The method of transporting a cooler and a beach chair on a bicycle according to claim 11, wherein:

when the beach chair is attached, it is further retained by an elastic cord having opposite ends that are attached to portions of the beach chair, and a middle portion that is attached to the holder; and before the beach chair is removed, the opposite ends of the elastic cord are detached from the portions of the beach chair.

* * * * *